United States Patent Office.

IMPROVED MODE OF DEFECATING CANE JUICE.

LAWRENCE REID, OF NEW YORK, N. Y., AND DAVID LYMAN, OF MIDDLEFIELD, CONNECTICUT, ADMINISTRATOR OF THE ESTATE OF EDWARD H. SWIFT, DECEASED, ASSIGNORS TO PHINEAS L. ROBINSON AND JOSEPH H. PARSONS.

Letters Patent No. 60,242, dated December 4, 1866; antedated November 29, 1866.

SPECIFICATION.

TO ALL WHOM IT MAY CONCERN:

Be it known that we, LAWRENCE REID, of New York city, in the county and State of New York, and DAVID LYMAN, of Middlefield, in the county of Middlesex, in the State of Connecticut, administrator on the estate of EDWARD H. SWIFT, deceased, do hereby declare that the said REID and the said SWIFT were joint inventors of certain new and useful improvements in Defecating Sugar-Cane Juice, with the use of superphosphate of lime; and we do hereby declare that the following is a full and exact description thereof.

This invention relates to the employment of superphosphate of lime in connection with a weak alkali, so as to remove the impurities with little danger of injuring the juice.

Instead of applying the alkali first and relying on it alone as a defecator, as has been generally heretofore practised, and employing the acid afterwards to neutralize the alkali; this process introduces the acid first or before the alkali, and when fully carried out in the hot defecation alternately adds acid and alkali in small increments to the juice. The process always commences with acid and ends with alkali, or rather ends by preference with a preparation invented by the same parties, which is nearly neutral but very slightly alkaline. The process may be conducted either with cold or hot juice. We prefer the cold.

We will now proceed to describe what we consider the best method of operating with the superphosphate of lime, and the proper accompanying materials to make the cold defecation, copying liberally from a description prepared during the lifetime and with the approval of Mr. SWIFT: We run the cane juice into a tank, say five feet deep, having previously strained it through wire gauze, to separate as much woody fibre and extraneous matter as possible. When the tank is nearly full we add about one pound of superphosphate of lime, prepared from bones by dilute sulphuric acid in the usual manner, to every seven hundred gallons of cane juice. We then add seven pounds of slaked lime which has been previously well mixed with about three gallons of water, well stirred, to cause a thorough wetting and breaking up of the particles of lime. The liquor in the tank is then well mixed and allowed to settle, which will take from an hour to an hour and one-half.

As cane juice varies much in its degree of acidity, we consider it a safe practice to keep the liquor on the alkaline side; and should we find the quantity of lime added insufficient to tinge weak turmeric paper brown, we would prefer to add more lime, mixed up with water as described, to effect that object. On taking out a small sample in a glass, it will in a few minutes be seen whether a clear defecation is taking place or not. As to the proportion of lime, it may run as high as ten pounds to the seven hundred gallons, without injury to the juice, as all excess of lime is separated by the filtration and the after process. About nine-tenths of the tank, which is clear liquor, may be drawn off into the boiler, and the remainder either filtered or farther settled and drawn off. Having got the clear liquor into the boiler, we boil and skim; then add a sufficiency of superphosphate of lime to neutralize any lime in the juice, and finally add a quantity of a prepared slightly alkaline phosphate of lime, invented by the same parties, to promote crystallization and prevent acidity. The mode of preparation of this latter material by lime and superphosphate of lime, so as to be peculiarly adapted for this use, is described in detail in a patent granted to us of even date herewith. The best proportions, generally, are one pound of the superphosphate of lime, using litmus paper to test the result, so as to avoid acidity, and about one pound of the prepared slightly alkaline phosphate of lime. By pursuing this process, we feel confident that we do not make any considerable quantity of uncrystallizable sugar. The result of numerous trials has shown that there was not an increase of one-half of one per cent., while some of the same juice, treated in the old mode, increased of uncrystallizable sugar from five to fifteen per cent.

We prefer a cold to a hot defecation of cane juice, still, from the want of facilities in the sugar-house to conduct the operations properly, and the necessity of having all the boilers in the train filled with juice before heating, and the frequent necessary hurry of the operation of sugar making, we will proceed to give the adaptation of the same materials for a hot defecation of cane juice:

In hot defecation of cane juice we prefer to heat up and skim before using any defecations. To every boiler of five hundred gallons of juice, after being heated to near boiling and skimmed, we add one-quarter of a pound of superphosphate of lime, dissolved in two quarts of water or juice, and immediately after as much slaked lime, mixed up with water, as will render the juice slightly alkaline, continuing to boil and skim, and after each operation repeating the superphosphate of lime and slaked lime as above until we have used from two to three pounds of the superphosphate for such quantity of juice. The defecation having now been completed, as described, we add about one-quarter of a pound of superphosphate to neutralize the slight excess of lime present, and immediately after one pound of the slightly alkaline phosphate of lime, to prevent acidity and promote crystallization. We can use cane juice instead of water to dissolve the materials, but it is preferable to use water, so that no cane juice is exposed to be injured by an excess of the chemicals. In this process, from the small proportions of lime and acid phosphate used at any one time, we believe that we avoid the injury the sugar is liable to sustain from the action of either acids or alkaline substances in excess; and as the reaction of the lime upon the superphosphate of lime immediately produces a neutral phosphate, we insist that we are defecating with a nearly neutral body that has the advantage of being slightly acid and alkaline alternately, and causing a very complete defecation of the juice.

We propose to use, under some circumstances, on account of the varying nature of cane juice, in addition to the superphosphate of lime, some one or more of the slightly acid bodies set forth as defecators in patents issued to us, bearing even date herewith, such as carbonic acid gas concentrated in water or juice under pressure; but we do not believe such combination of processes to be generally expedient. When such are used, the quantity of superphosphate may be correspondingly diminished.

The process for preparing the superphosphate of lime, which we have referred to in the above defecation, consists in taking one hundred pounds of burned bones, finely ground, sixty-six pounds of sulphuric acid, (oil of vitriol,) one hundred gallons of water. We mix the sulphuric acid with forty gallons of water in a barrel capable of containing one hundred and fifteen gallons; we then add slowly through a sieve the ground bones, stirring the fluid with a wooden oar. Considerable heat is evolved. The sulphuric acid combining with the lime of the bones forms a sulphate of lime, which is nearly insoluble. The effervescence that takes place is caused by the sulphuric acid combining with the lime of the carbonate of lime in the bones and setting at liberty the carbonic acid gas. After the effervescence has ceased, which may be in about six hours, we then add the remainder of the water, mixing it well with the semi-solid mass in the barrel, and allow it to settle. The clear liquor is the superphosphate of lime. This is evaporated down in a leaden vessel to the consistence of a very thick sirup. It is then mixed with about one-sixth of its weight of powdered charcoal, to act as an absorbent. It is then fit for use, and should be put into sound, air-tight barrels, as it is liable to attract water from the atmosphere and become deliquescent.

The varying nature of cane juice at different periods, and particularly on different estates, renders it desirable to vary the proportions of the materials considerably, which will be determined by the practical sugar maker. We obtain, as a general result, the production of from fifteen to thirty per cent. more sugar, and of a better quality than usual, and the saving to the estates of the cost and trouble in the use of bone-black, and where vacuum pans are employed, producing a sugar equal to that produced by bone-black.

Having now fully described the invention, what we claim as new, and as the invention of the said LAWRENCE REID and EDWARD H. SWIFT, deceased, and desire to secure by Letters Patent, is as follows:

We claim the mode herein described of defecating cane juice with superphosphate of lime and slaked lime, introducing some of the superphosphate in advance of the lime, as herein specified, with or without the final use of the prepared slightly alkaline phosphate of lime described, to correct acidity and promote the crystallization of the sugar.

We also claim in the defecation of cane juice the alternate use of superphosphate of lime and slaked lime, in small proportions, and in two or more successive increments, as described by us above.

We also claim the combination with the superphosphate of lime in the above described process of one or more of the other defecating agents set forth in patents issued to us, of even date herewith.

LAWRENCE REID,
DAVID LYMAN.

Witnesses:
D. W. STETSON,
D. L. FREEBORN, } To L. R.
H. WOODWARD,
LYMAN A. MILLS, } To D. L.